United States Patent [19]

Falzoni

[11] Patent Number: 4,864,894

[45] Date of Patent: Sep. 12, 1989

[54] MANUAL OVERRIDE CONTROL OF CONTINUOUSLY VARIABLE TRANSMISSION

[75] Inventor: Gianluigi Falzoni, Torino, Italy

[73] Assignee: Fiat Auto S.p.A., Torino, Italy

[21] Appl. No.: 3,343

[22] Filed: Jan. 14, 1987

[30] Foreign Application Priority Data

Jan. 14, 1986 [IT] Italy .................... 67030 A/86

[51] Int. Cl.[4] .................. B60K 41/08; B60K 41/06
[52] U.S. Cl. ........................... 74/866; 74/867; 74/856
[58] Field of Search ............... 74/878, 862, 856, 866

[56] References Cited

U.S. PATENT DOCUMENTS

| | | | |
|---|---|---|---|
| 3,894,443 | 7/1975 | Beig et al. | 74/878 X |
| 4,148,231 | 4/1979 | Redzinski | 74/866 |
| 4,174,641 | 11/1979 | Hillman | 474/18 |
| 4,280,604 | 7/1981 | Lambicco | 74/866 X |
| 4,509,125 | 4/1985 | Frattic et al. | 74/866 |
| 4,523,496 | 6/1985 | Fukunaga | 74/862 X |
| 4,590,561 | 5/1986 | Abo et al. | 74/866 X |
| 4,597,308 | 7/1986 | Tanaka et al. | 474/28 |
| 4,598,611 | 7/1986 | Frank | 74/857 X |
| 4,615,409 | 10/1986 | Kuppler et al. | 74/866 |
| 4,660,440 | 4/1987 | Matsumura | 74/856 |

FOREIGN PATENT DOCUMENTS

| | | | |
|---|---|---|---|
| 0026470 | 9/1980 | European Pat. Off. | 74/866 |
| 3118048 | 11/1982 | Fed. Rep. of Germany | 74/866 |
| 3201440 | 8/1983 | Fed. Rep. of Germany | 74/866 |
| 115648 | 9/1980 | Japan | 74/866 |

*Primary Examiner*—Leslie A. Braun
*Assistant Examiner*—William Gehris
*Attorney, Agent, or Firm*—Sughrue, Mion, Zinn, Macpeak & Seas

[57] ABSTRACT

The gearbox includes a continuous transmission-ratio variator and a control and operating unit for causing, through actuator devices, the variation of the transmission ratio by the variator in dependence on signals supplied by sensors of the speed of the motor vehicle and the number of revolutions of the engine. In addition, a control device operable manually by the driver, for example a potentiometer with a sliding contact, is connected to the control and operating unit to supply to the unit an electrical signal variable in dependence on the extent of its operation. The control and operating unit is arranged to modify in a predetermined manner the mode of variation of the transmission ratio by the variator, in dependence on the signals supplied by the control device.

3 Claims, 1 Drawing Sheet

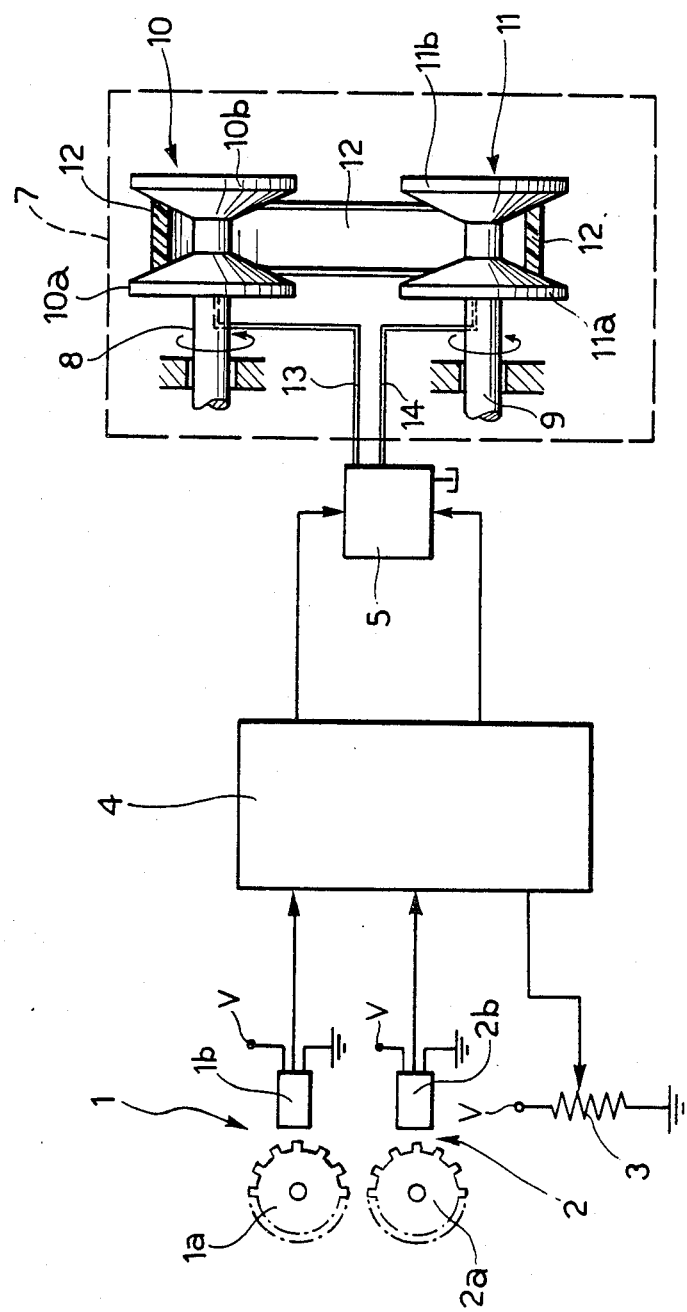

MANUAL OVERRIDE CONTROL OF CONTINUOUSLY VARIABLE TRANSMISSION

BACKGROUND OF THE INVENTION

The present invention relates to a gearbox, and particularly an automatic stepless gearbox for motor vehicles, comprising:

a continuous transmission-ratio variator, sensor means for supplying electrical signals indicative of the speed of the motor vehicle and of the number of revolutions of the engine, and a control and operating unit for causing, through actuator devices, the variation of the transmission ratio by the variator in accordance with a predetermined mode dependent upon the signals supplied by the sensor means.

The known devices of this type are generally characterised by a satisfactory operation. Under certain conditions of running of the motor vehicle, however, they suffer from drawbacks which cannot be ignored. In general terms, these drawbacks are associated, paradoxically, with the characteristics of full automation of the operation of such devices. Thus, for example, when a motor vehicle fitted with an automatic stepless gearbox of the aforesaid type is travelling down a hill of considerable gradient, the transmission ratio automatically set by the gearbox becomes excessively "long" and the braking action which can be positively and conveniently exerted by the engine of the motor vehicle is absent or inadequate.

SUMMARY OF THE INVENTION

The object of the present invention is to provide an automatic stepless change-speed device of the aforesaid type which overcomes the aforementioned drawbacks of the prior art devices.

This object is achieved, according to the invention, by means of a change-speed device of the type defined at the beginning, characterised in that it further includes a control device which can be operated manually by the driver of the motor vehicle and is connected to the control unit to supply to the unit an electrical signal variable in dependence on the extent of its operation, and in that the unit is arranged to modify in a predetermined manner the mode of variation of the transmission ratio by the variator in dependence on the signals supplied by the control device.

With the device according to the invention, the driver can operate the control device, for example, in the aforementioned condition of going down a hill with a steep gradient, so that the transmission ratio set by the variator is below a predetermined value. In this way, it is possible to ensure an adequately efficient engine braking action in such circumstances.

BRIEF DESCRIPTION OF THE DRAWINGS

Further characteristics and advantages of the device according to the invention will become apparent from the detailed description which follows with reference to the appended drawing, provided purely as a non-limiting example, in which an embodiment of the device according to the invention is shown diagrammatically.

DETAILED DESCRIPTION OF THE INVENTION

With reference to the drawing, a sensor of the speed of the motor vehicle is generally indicated 1 and comprises, for example, a toothed wheel 1a which a sensor 1b, for example of the proximity-effect type, is coupled. In use, the output of the sensor supplies a pulsed signal of a frequency proportional to the forward speed of the motor vehicle.

A sensor of the rotational speed of the shaft of the engine of the motor vehicle is indicated 2. Similarly to the sensor 1, this sensor may comprise a toothed wheel 2a associated with the engine shaft and coupled to a proximity sensor 2b.

Naturally, other devices may be used to obtain electrical signals indicative of the forward speed of the vehicle and of the speed of rotation of the engine shaft.

A potentiometer, generally indicated 3, comprises a resistor element connected between a supply voltage source V and earth, and a manually-operable sliding contact. The potentiometer 3 is located in the passenger compartment in a position within easy reach of the driver.

The sensors 1, 2 and the potentiometer 3 are connected to corresponding inputs of an electronic control and operating unit 4 made, for example, with the use of a microprocessor. This unit is connected to an electro-hydraulic actuator unit 5.

A variator of V-belt type is generally indicated 7. This variator transmits the movement from the drive shaft 8 (driving shaft) to a driven shaft 9. It comprises, in known manner, two axially-expansible pulleys 10 and 11, primary and secondary respectively, which are associated with shafts 8, 9 and between which a transmission V-belt 12 is disposed. These pulleys have respective pairs of conical rotors 10a, 10b and 11a, 11b, which face each other and are coaxial. The conical rotors 10a and 11a can be moved axially towards or away from their facing rotors.

The electro-hydraulic unit 5 is connected to the movable rotors 10a and 11b by lines 13 and 14 and (in known manner) can bring about their movement towards or enable their movement away from the rotors they face, in dependence on the signals transmitted by the control unit 4. When the electro-hydraulic actuator unit 5 causes the expansion of the pulley 10 and a corresponding contraction of the pulley 11, a corresponding increase of the transmission ratio is produced.

The electronic control and operating unit 4 is arranged, by means of conventional programming technology, to cause, through the electro-hydraulic actuator device 5, the variation of the transmission ratio in such a manner that, for each running condition detected by the sensors 1 and 2, the variator 7 sets a predetermined transmission ratio, in accordance with characteristic curves memorized beforehand in the control and operating unit 4.

According to the invention, the memory devices of the control and operating unit 4 store a plurality of modes of variation (characteristic curves) of the transmission ratio dependent on the conditions detected by the sensors 1 and 2. In operation, in dependence on the signal supplied by the potentiometer 3 operated manually by the driver, the control and operating unit 4 pilots the unit 5 in such a manner as to follow or carry out the mode of variation of the transmission ratio corresponding to the signal supplied by the potentiometer 3. Thus, for a particular condition of running indicated by the sensors 1 and 2, the electronic control and operating unit 4 will cause the setting of a maximum or minimum transmission ratio according to whether the sliding contact of the potentiometer 3 is in one or other of its end-of-travel positions, the transmission ratio produced by the variator 7 assuming values intermediate the extreme values in correspondence with positions of the sliding contact 3 intermediate the end-of-travel positions.

Through the use of entirely conventional programming techniques, the control and operating unit 4 can also be arranged such that the transmission ratio produced by the variator 7 is greater than a predetermined value when the speed of the motor vehicle detected by the sensor 1 exceeds a predetermined value, to prevent the operation of the engine in the "over-revving" condition. In a similar manner, the unit 4 may be arranged to prevent the production of transmission ratios above a determined value when the speed of the vehicle is below a preset minimum value.

The above-described gearbox, though exhibiting all the advantages of traditional automatic stepless gearbox, allows a margin of manual intervention by the driver to enable the overcoming of the drawbacks of the prior art automatic gearboxes described above.

I claim:
1. An automatic stepless change-speed device for motor vehicles, comprising
    a continuous transmission ratio variator;
    sensor means for supplying electrical signals indicative of the speed of the motor vehicle and of the number of revolutions of the engine,
    a control unit for causing, through actuator devices, the variation of the transmission ratio by the variator in dependence on the signals supplied by the sensor means, and
    a manually operable control device which can be operated manually by the driver of the motor vehicle so as to allow the driver to modify of his own will within predetermined limits the value of the transmission ratio of the said variator with respect to the value determined by the said control unit in dependence on the signals supplied by the said sensor means; the said control device being connected to the control unit to supply to the unit an electrical signal variable in dependence on the extend of its operation; the unit being arranged to modify in a predetermined manner the mode of variation of the transmission ratio by the variator in dependence on the signals supplied by said control device, wherein the said control device includes a potentiometer having a sliding contact and the said control unit is predisposed to cause the setting of a maximum or minimum transmission ratio by the said variator when the sliding contact of said potentiometer is manually brought by the driver in one or the other of its end-of-travel positions; the control unit causing the variator to assume transmission ratios intermediate said maximum and minimum values in correspondence with positions of the said sliding contact intermediate the end-of-travel positions.

2. A device according to claim 1, wherein the electronic control unit is arranged to prevent the setting of transmission ratios in excess of a predetermined value when the signals supplied by the sensor means indicate that the forward speed of the motor vehicle is below a preset minimum value.

3. A device according to claim 2, wherein the electronic control unit is arranged to prevent the production of transmission ratios below a predetermined value when the signals supplied by the sensor means indicate that the speed of the motor vehicle exceeds a predetermined value.

* * * * *